United States Patent
Morino et al.

(10) Patent No.: US 11,897,552 B2
(45) Date of Patent: Feb. 13, 2024

(54) STEERING CONTROL SYSTEM

(71) Applicants: TOYOTA JIDOSHA KABUSHIKI KAISHA, Aichi-ken (JP); JTEKT CORPORATION, Osaka (JP)

(72) Inventors: Tetsuya Morino, Susono (JP); Yoshio Kudo, Machida (JP); Isao Namikawa, Okazaki (JP); Takashi Kodera, Okazaki (JP)

(73) Assignees: TOYOTA JIDOSHA KABUSHIKI KAISHA, Toyota (JP); JTEKT CORPORATION, Osaka (JP)

( * ) Notice: Subject to any disclaimer, the term of this patent is extended or adjusted under 35 U.S.C. 154(b) by 407 days.

(21) Appl. No.: 17/220,014

(22) Filed: Apr. 1, 2021

(65) Prior Publication Data

US 2021/0323599 A1   Oct. 21, 2021

(30) Foreign Application Priority Data

Apr. 15, 2020   (JP) ................. 2020-072834

(51) Int. Cl.
*B62D 5/04* (2006.01)
*B62D 5/00* (2006.01)
*B62D 6/00* (2006.01)

(52) U.S. Cl.
CPC ............ *B62D 5/046* (2013.01); *B62D 5/006* (2013.01); *B62D 6/00* (2013.01)

(58) Field of Classification Search
CPC ........... B62D 5/046; B62D 5/006; B62D 6/00
See application file for complete search history.

(56) References Cited

U.S. PATENT DOCUMENTS

| 2005/0021204 A1 | 1/2005 | Kudo |
| 2017/0232889 A1 | 8/2017 | Miura et al. |
| 2020/0269905 A1 | 8/2020 | Sugawara et al. |

FOREIGN PATENT DOCUMENTS

| CN | 111114625 A | * | 5/2020 | ........... B62D 5/0463 |
| CN | 113348126 A | * | 9/2021 | ............. B62D 5/046 |
| EP | 1 500 574 B1 | | 9/2006 | |
| EP | 1500574 B1 | * | 9/2006 | ............. B62D 1/286 |
| EP | 3647158 A1 | * | 5/2020 | ........... B62D 15/021 |
| JP | 2007-062472 A | | 3/2007 | |
| JP | 2017-144779 A | | 8/2017 | |
| JP | 2017-154623 A | | 9/2017 | |
| WO | 2019/235609 A1 | | 12/2019 | |

\* cited by examiner

*Primary Examiner* — Jacob D Knutson
(74) *Attorney, Agent, or Firm* — Sughrue Mion, PLLC

(57) ABSTRACT

The steering control system of a steer-by-wire vehicle includes a turning angle calculation unit for calculating a target turning angle based on a steering angle of a steering wheel, and a reaction torque calculation unit for calculating a target reaction torque based on a state of the vehicle. When an alert request is issued, the reaction torque calculation unit calculates a basic reaction torque based on the steering angle, calculates an alert reaction torque for notifying a vehicle state, and calculates the target reaction torque obtained by summing the basic reaction torque and the alert reaction torque. In a process of calculating the target turning angle from the steering angle, the turning angle calculation unit calculates the target turning angle by excluding a steering angle or a turning angle corresponding to the alert reaction torque.

6 Claims, 8 Drawing Sheets

STEERING CONTROL SYSTEM

CROSS-REFERENCE TO RELATED APPLICATION

The present application claims priority under 35 U.S.C. § 119 to Japanese Patent Application No. 2020-072834, filed Apr. 15, 2020, the contents of which application are incorporated herein by reference in their entirety.

BACKGROUND

Field

The present disclosure relates to steering control systems, and more particularly, to steering control system for a steer-by-wire vehicle.

Background

Japanese Patent Application Laid-Open No. 2007-062472 (JP2007-062472A) discloses a technique related to a steering device for a vehicle of a steer-by-wire system. The device of this technique includes a drowsiness sensor for detecting drowsiness of a driver. When the drowsiness of a driver is detected by the drowsiness sensor, the device temporarily releases an interlocking relationship between a steering wheel and a steering actuator, and forcibly rotates the steering wheel to the left and right to inform the driver that he or she is asleep.

SUMMARY

In the technique of JP2007-062472A, an interlocking relationship between a steering wheel and a steering actuator is temporarily released so that the steering of the steering wheel for notification is not superimposed on the steering angle of the steering wheel. However, if the interlocking relationship between the steering wheel and the steering actuator is released, a turning of turning wheels based on the steering of the driver cannot be performed. Thus, the technique of Patent Document 1 has a problem in the technology to realize the operation of the steering wheel by the driver during the alert to the driver via the steering wheel.

The present disclosure has been made in view of the above-mentioned problems, and an object of the present disclosure is to provide a steering control system that enables operation of a steering wheel by a driver in a steer-by-wire vehicle, even during alert to a driver via a steering wheel.

To solve the above problems, the first disclosure is applied to a steering control system for a steer-by-wire vehicle. The steering control system includes a turning motor for turning wheels of the vehicle, a reaction torque motor for applying a reaction torque to a steering wheel of the vehicle, and a controller. The controller is configured to execute a turning angle calculation for calculating a target turning angle of the wheels for controlling the turning motor based on a steering angle of the steering wheel, and a reaction torque calculation for calculating a target reaction torque for controlling the reaction torque motor based on a state of the vehicle. When an alert request is issued, in the reaction torque calculation, the controller is configured to calculate a basic reaction torque based on the steering angle, calculate an alert reaction torque for notifying a vehicle state, and calculate the target reaction torque, which is a total torque obtained by summing the basic reaction torque and the alert reaction torque. In a process of the turning angle calculation calculating the target turning angle from the steering angle, the controller is configured to calculate the target turning angle by excluding a steering angle or a turning angle corresponding to the alert reaction torque.

The second disclosure has the following further features in the first disclosure.

In the turning angle calculation, the controller is configured to calculate an alert steering angle which is a steering angle corresponding to the alert reaction torque, and calculate the target turning angle based on a driver steering angle excluding the alert steering angle from the steering angle.

The third disclosure has the following further features in the first disclosure.

In the turning angle calculation, the controller is configured to calculate an alert steering angle which is a steering angle corresponding to the alert reaction torque, calculate a first turning angle based on the steering angle, calculate a second turning angle based on the alert steering angle, and calculate the target turning angle, which is a steering angle obtained by excluding the second turning angle from the first turning angle.

The fourth disclosure has the following further features in the first disclosure.

In the turning angle calculation, the controller is configured to calculate a driver steering angle from which a frequency component of a steering angle corresponding to the alert reaction torque is removed by performing a filter processing on the steering angle, and calculate the target turning angle based on the driver steering angle.

The fifth disclosure has the following further features in the first disclosure.

In the turning angle calculation, the controller is configured to calculate a first turning angle based on the steering angle, and calculate the target turning angle from which the frequency component of the steering angle corresponding to the alert reaction torque is removed by performing a filter processing on the first turning angle.

The sixth disclosure has the following further features in the first disclosure.

In the reaction torque calculation, the controller is configured to change a vibration amplitude or a vibration period of the alert reaction torque according to an emergency degree of a vehicle state.

The seventh disclosure has the following further features in the first disclosure.

The alert request is a request issued when it is determined that the vehicle in travel deviates from a traveling lane.

According to the steering control system of the present disclosure, when the alert request is issued, the target turning angle can be calculated by excluding the turning angle or the steering angle corresponding to the alert reaction torque. Thus, it is possible to prevent the vibration due to the alert reaction torque from being superimposed on the turning angle of the wheels. As a result, even during the alert to the driver via the steering wheel, it is possible to perform the operation of the turning wheels by the driver.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

1. First Embodiment 1-1. Steering Control System

Figure 1:
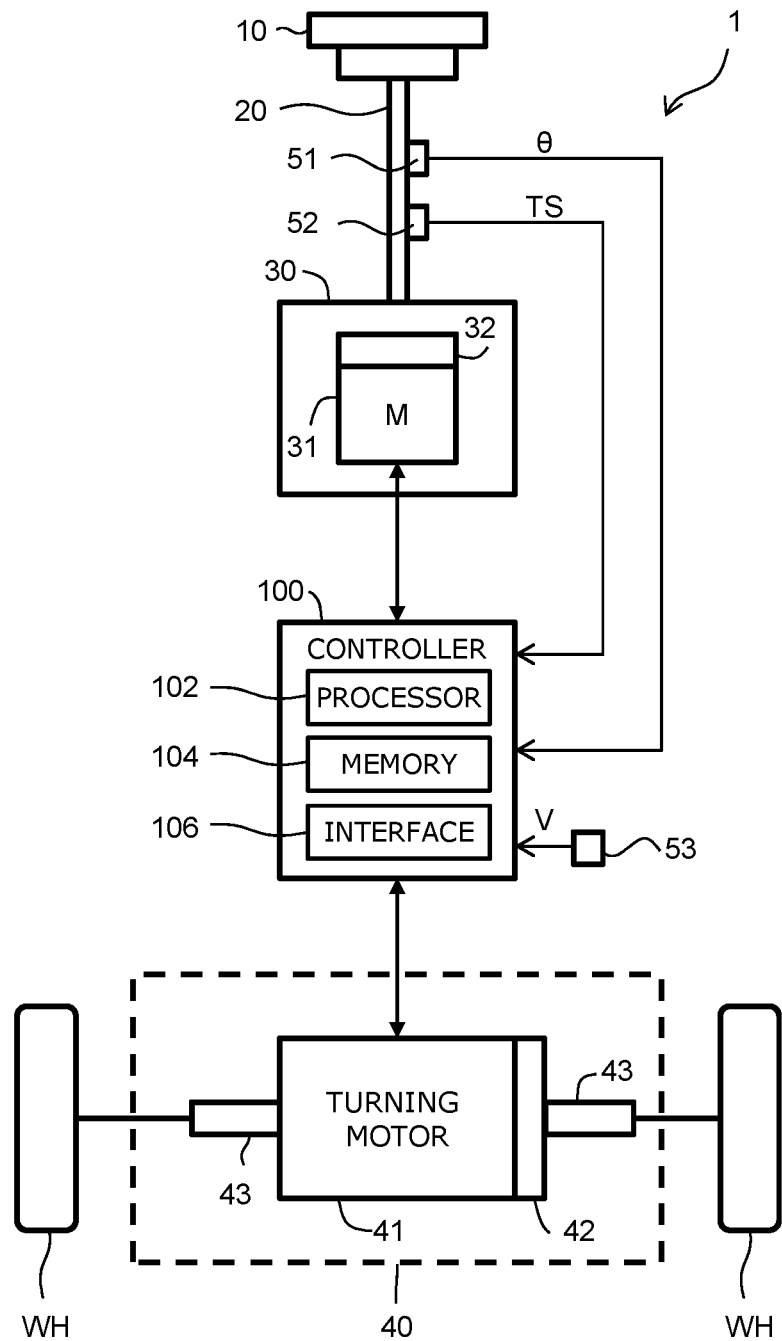
FIG. 1 is a block diagram schematically illustrating a configuration example of a steering control system according to a first embodiment.

FIG. 1 is a block diagram schematically illustrating a configuration example of a steering control system according to the present embodiment. A steering control system 1 is mounted on the vehicle, and turns wheels WH of the vehicle by a steer-by-wire manner. That is, the steering control system 1 realizes a steer-by-wire vehicle.

In the example illustrated in FIG. 1, the steering control system 1 includes a steering wheel 10, a steering shaft 20, a reaction force generating device 30, a turning device 40, sensor groups 51 to 53, and a controller 100.

The steering wheel 10 is an operating member used by a driver for steering. The steering shaft 20 is connected to the steering the steering wheel 10 and rotates together with the steering wheel 10.

The turning device 40 turns the wheels WH. Specifically, the turning device 40 includes a turning motor 41, a reduction gear 42, and a turning shaft 43. A rotor of the turning motor 41 is connected to the turning shaft 43 via the reduction gear 42. The turning shaft 43 is connected to the wheels WH. When the turning motor 41 rotates, its rotational motion is converted into a linear motion of the turning shaft 43, whereby the wheels WH are turned. That is, by the operation of the turning motor 41, it is possible to turn the wheels WH. The operation of the turning motor 41 is controlled by the controller 100.

The turning device 40 is mechanically separated from the steering wheel 10 and the reaction force generating device 30 on the steering side.

The steering angle sensor 51 detects a steering angle θ which is a rotation angle of the steering wheel 10. The steering angle sensor 51 sends information of the detected steering angle θ to the controller 100.

A steering torque sensor 52 detects a steering torque TS applied to the steering shaft 20. The steering torque sensor 52 sends information of the detected steering torque TS to the controller 100.

The vehicle speed sensor 53 detects a vehicle speed V, which is the speed of the vehicle. The vehicle speed sensor 53 sends information on the detected vehicle speed V to the controller 100. Alternatively, a wheel speed sensor may be used instead of the vehicle speed sensor 53, and the vehicle speed V may be calculated from the rotational speed of each wheel.

The controller 100 controls the steering control system according to the present embodiment. The controller 100 includes a microcomputer having a processor 102, a memory 104, and an input/output interface 106. This microcomputer is also called an ECU (Electronic Control Unit). The processor 102 executes a control program stored in the memory 104, thereby executing processing by the controller 100.

1-2. Basic Configuration of Controller

Figure 2:
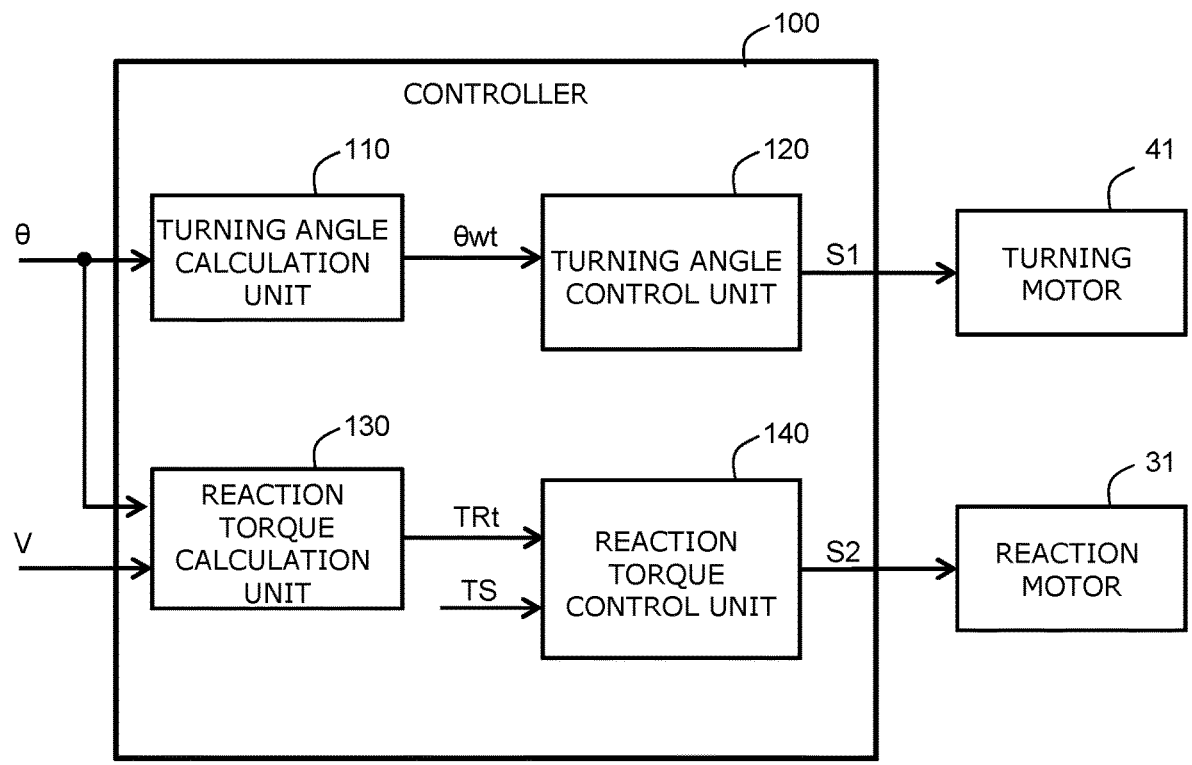
FIG. 2 is a block diagram for explaining basic functions of a controller.

FIG. 2 is a block diagram for explaining the basic functions of the controller. The controller 100 controls the turning of the wheels WH by controlling the turning motor 41 in accordance with the rotation of the steering wheel 10. This control is also referred to as "turning angle control". Further, the controller 100 controls a final reaction torque TR applied to the steering wheel 10 by controlling the reaction torque motor 31 in accordance with the rotation of the steering wheel 10. This control is also referred to as "reaction torque control". The controller 100 includes a turning angle calculation unit 110, a turning angle control unit 120, a reaction torque calculation unit 130, and a reaction torque control unit 140 as functional blocks for realizing the turning angle control and the reaction torque control.

The turning angle calculation unit 110 receives an input of the steering angle θ, and outputs a target turning angle θwt. In a normal operation in which an alert request AR described later is not issued, the steering angle θ coincides with a driver steering angle θd which is the steering angle steered by the driver. The turning angle calculation unit 110 calculates the target turning angle θwt using the following equation (1) using the driver steering angle θd and a speed increasing rate K corresponding to a variable gear ratio. The calculated target turning angle θwt is output to the turning angle control unit 120.

$$\theta wt = \theta d \times K \quad (1)$$

The turning angle control unit 120 controls the turning motor 41 so that the turning angle of the wheels WH becomes the target turning angle θwt. More specifically, the turning angle control unit 120 generates a current control signal S1 for driving the turning motor 41 on the basis of the rotation angle of the turning motor 41 and the target turning angle θwt. The turning motor 41 is driven according to the current control signal S1, and the wheels WH are turned by the rotation of the turning motor 41.

The reaction torque calculation unit 130 receives inputs of the steering angle θ and the vehicle speed V, and outputs a target reaction torque TRt. The reaction torque calculation unit 130 stores the reaction torque characteristics representing the relationship of the magnitude of the target reaction torque TRt with respect to the steering angle θ for each state of the vehicle. The state of the vehicle is, for example, the vehicle speed V. The reaction torque characteristics are related so that the larger the vehicle speed V, the smaller the magnitude of the target reaction torque TRt with respect to the steering angle θ. The reaction torque calculation unit 130 calculates the target reaction torque TRt corresponding to the input steering angle θ and the vehicle speed V from the reaction torque characteristics. The calculated target reaction torque TRt is output to the reaction torque control unit 140.

The reaction torque control unit 140 controls the reaction torque motor 31 so that the target reaction torque TRt is generated. More specifically, the reaction torque control unit 140 generates a current control signal S2 for driving the reaction torque motor 31 based on the calculated target reaction torque TRt, the rotation angle of the reaction torque motor 31, the steering torque TS, and the like. The reaction torque motor 31 is driven according to the current control signal S2, thereby generating the final reaction torque TR.

The controller 100 may separately include a first controller including the turning angle calculation unit 110 and the turning angle control unit 120 for realizing the turning angle control, and a second controller including the reaction torque calculation unit 130 and the reaction torque control unit 140 for realizing the reaction torque control. In this case, the first controller and the second controller are communicably connected to each other and exchange necessary information with each other.

1-3. Alert Control

The vehicle mounted with the steering control system 1 of the present embodiment is provided with preventive safety functions for notifying the driver of alerts related to the vehicle state. For example, in a lane departure alert (LDA), which is one of preventive safety functions, a camera mounted on a vehicle recognizes a white line or a yellow line that distinguishes a traveling lane drawn on a road. Then, when the driver is about to deviate from the traveling lane without operating a direction indicator while the vehicle is travelling, the driver is alerted. The control for this alert is referred to as "alert control."

In the steering control system 1 of the present embodiment, by applying vibration to the steering wheel 10 by reaction torque control using the reaction torque motor 31, alert the control can be realized.

Figure 3:
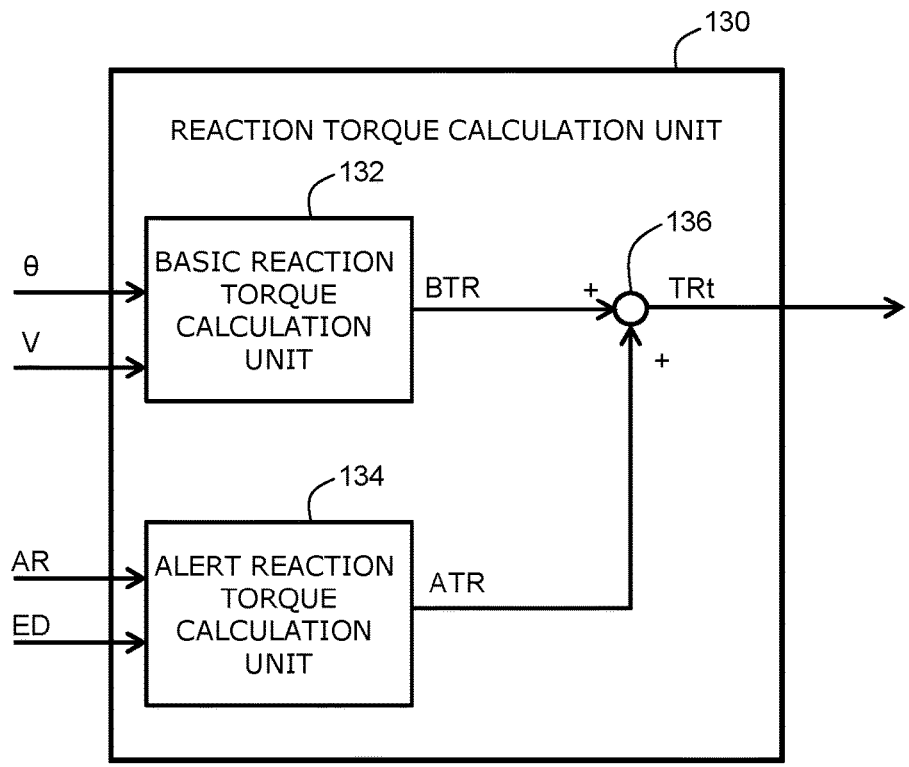
FIG. 3 is a block diagram for explaining functions of a reaction torque calculation unit.

FIG. 3 is a block diagram for explaining functions of the reaction torque calculation unit 130. The function for performing the alert control is incorporated in the reaction force torque calculation unit 130. The reaction torque calculation unit 130 includes a basic reaction torque calculation unit 132, an alert reaction torque calculation unit 134, and a target reaction torque calculation unit 136.

The basic reaction torque calculation unit 132 receives the inputs of the steering angle θ and the vehicle speed V, and outputs a basic reaction torque BTR corresponding to the normal part of the reaction torque. The basic reaction torque BTR corresponding to the input steering angle θ and the vehicle speed V is calculated from the reaction torque characteristics described above. The calculated basic reaction torque BTR is output to the target reaction torque calculation unit 136.

Figure 4:
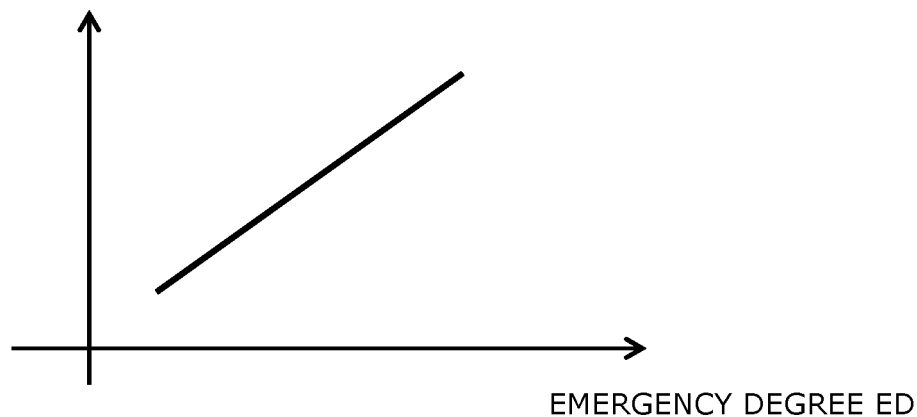
FIG. 4 is a diagram showing an example of a first characteristic stored in the controller.
Figure 5:
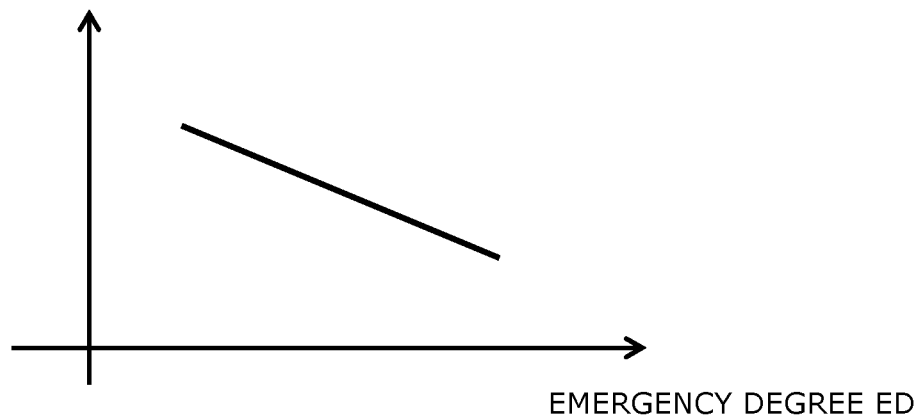
FIG. 5 is a diagram showing an example of a second characteristic stored in the controller.

The alert reaction torque calculation unit 134 calculates an alert reaction torque ATR for an alert in response to the issuance of the alert request AR. The alert reaction torque ATR is a component of the vibration input to the steering wheel 10 for the alert to the driver, and is composed of a specified amplitude and cycle. The alert reaction torque calculation unit 134 stores a first characteristic representing the relationship between the magnitude of the vibration amplitude of the alert reaction torque ATR with respect to the input of an emergency degree ED of the vehicle state and a second characteristic representing the relationship between the magnitude of the vibration period of the alert reaction torque ATR with respect to the input of the emergency degree ED. The emergency degree is, for example, the amount of departure of the lane. FIG. 4 is a diagram showing an example of the first characteristic stored in the controller. FIG. 5 is a diagram showing an example of the second characteristic stored in the controller. The vibration amplitude and the vibration period of the alert reaction torque ATR corresponding to the input emergency degree ED are calculated from the first characteristic and the second characteristic shown in FIGS. 4 and 5 described above.

The alert reaction torque calculation unit 134 outputs the calculated alert reaction torque ATR to the target reaction torque calculation unit 136 while the alert request AR is issued. On the other hand, while the alert request AR is not issued, the alert reaction torque calculation unit 134 outputs an invalid value or 0 (zero) as the alert reaction torque ATR to the target reaction torque calculation unit 136. The target reaction torque calculation unit 136 outputs a total torque obtained by summing the basic reaction torque BTR and the alert reaction torque ATR as the target reaction torque TRt.

According to the alert control, the alert reaction torque ATR can be superimposed on the target reaction torque TRt while the alert request AR is issued. The reaction torque control unit 140 controls the reaction torque motor 31 so that the target reaction torque TRt is generated. As a result, while the alert request AR is issued, vibration due to the alert reaction force is applied to the steering wheel 10.

1-4. Turning Angle Calculation Processing

Figure 6:
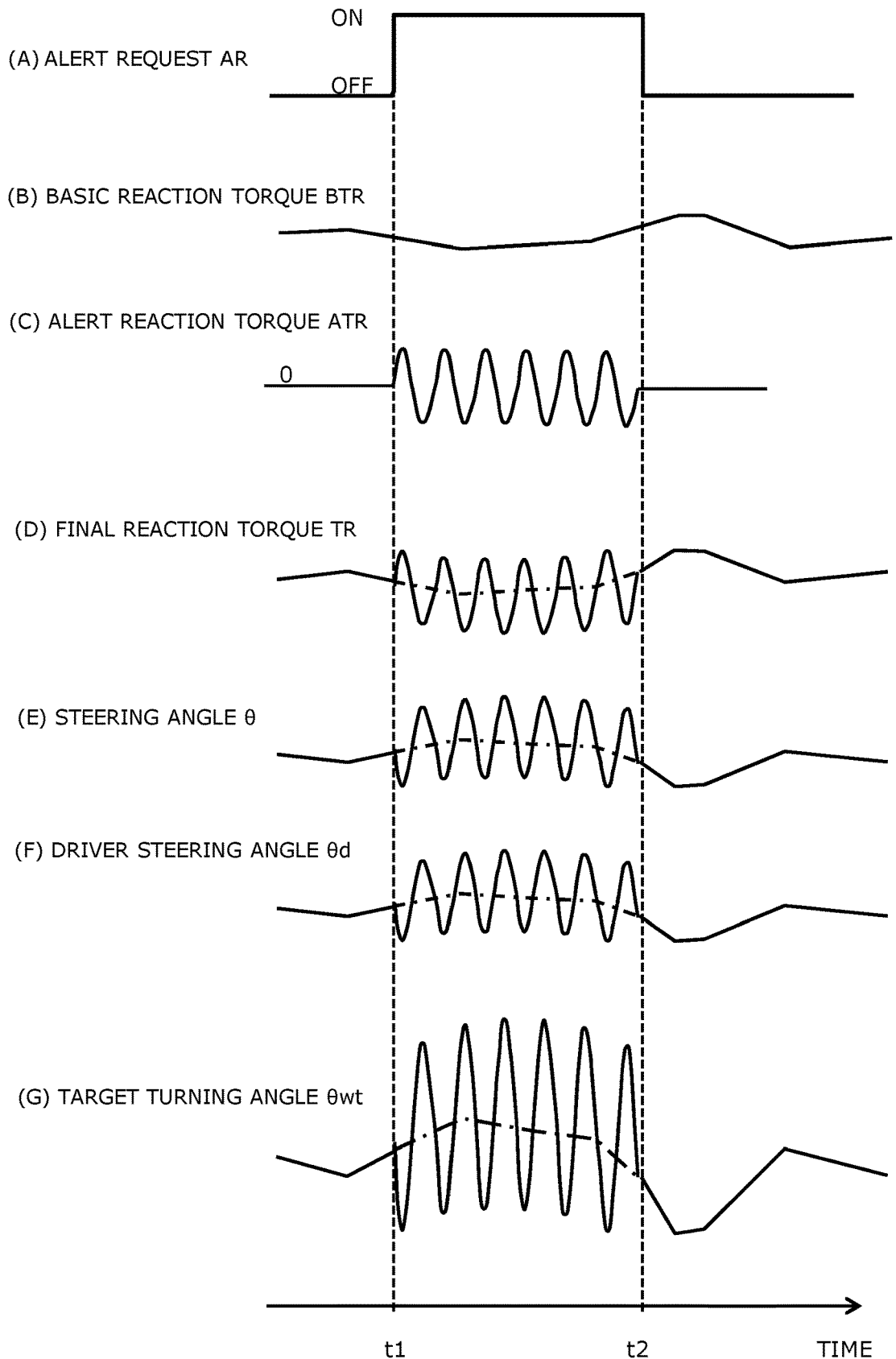
FIG. 6 is a time chart showing changes in various state amounts while an alert request is issued in the steering control system of a comparative example.

Executing the alert control described above causes the following problems. FIG. 6 is a time chart showing changes in various state amounts while the alert request is issued in the steering control system of a comparative example. In FIG. 6, the chart (A) shows the alert request AR, the chart (B) shows the basic reaction torque BTR, the chart (C) shows the alert reaction torque ATR, the chart (D) shows the final reaction torque TR, the chart (E) shows the steering angle θ, the chart (F) shows the driver steering angle θd, and the chart (G) shows the target turning angle θwt.

Consider the time period from time t1 to time t2 when the alert request AR is issued, as shown in the chart (A) in FIG. 6. As shown in the chart (C), the alert reaction torque ATR is generated during the period in which the alert request AR is issued. As shown in the chart (D), when the alert reaction torque ATR is superimposed on the final reaction torque TR, the steering angle θ vibrates accordingly. The vibration of the steering angle θ shown in the chart (E) is detected by the steering angle sensor 51. The turning angle calculation unit 110 calculates a target turning angle θwt using the detected steering angle θ. Therefore, when the driver steering angle θd shown in the chart (F) coincides with the steering angle θ, the vibration caused by the alert control is reflected in the target turning angle θwt. In specifically, in a system in which the target turning angle θwt is variable in gear ratio, the vibration amplitude of the steering angle may be increased more than the vibration amplitude of the steering angle, so that the influence on drivability becomes larger.

Figure 7:
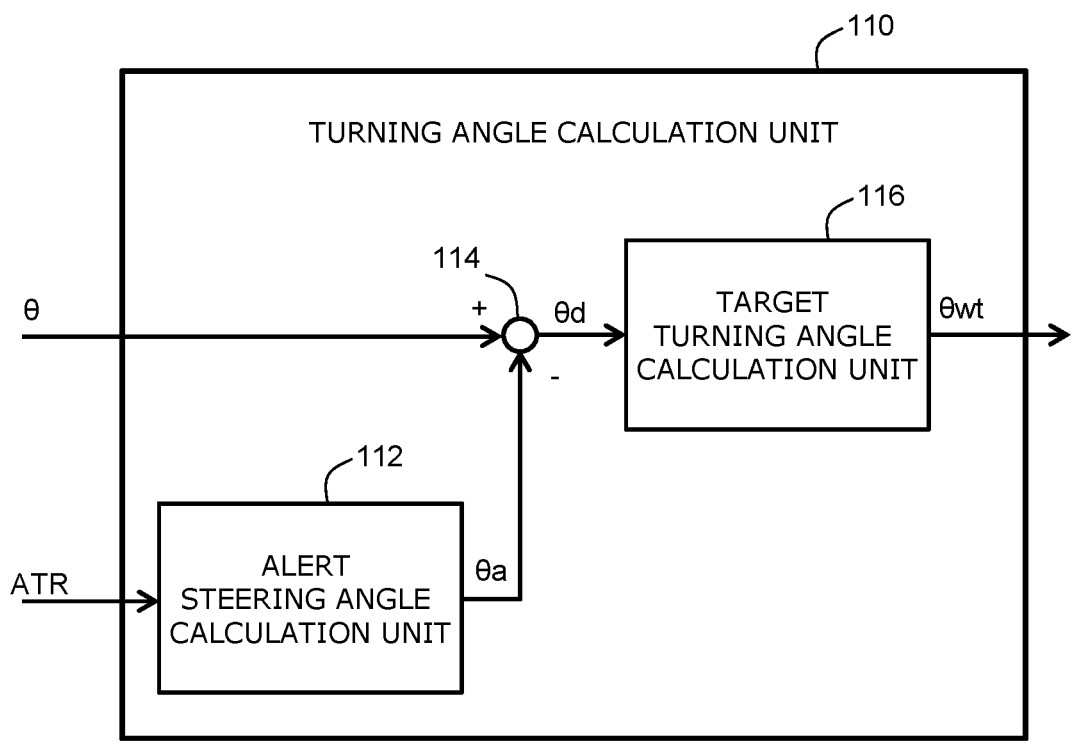
FIG. 7 is a block diagram for explaining functions of a steering angle calculation unit.

Therefore, in the process of calculating the target turning angle θwt from the steering angle θ, the steering control system 1 of the present embodiment executes a "turning angle calculation process" in which the influence of the vibration of the steering wheel 10 by the alert control is excluded from the steering angle. FIG. 7 is a block diagram for explaining the functions of the turning angle calculation unit 110. The function for executing the turning angle calculation process is incorporated in the turning angle calculation unit 110. The turning angle calculation unit 110 includes an alert steering angle calculation unit 112, a driver steering angle calculation unit 114, and a target turning angle calculation unit 116.

The alert steering angle calculation unit 112 is a functional block for calculating an alert steering angle θa corresponding to the alert reaction torque ATR. The alert reaction torque ATR calculated by the alert reaction torque calculation unit 134 is input to the alert steering angle calculation unit 112. The alert steering angle calculation unit 112 calculates the alert steering angle θa corresponding to the alert reaction torque ATR using the following equation (2). The torque constant (Nm/deg) in the following equation (2) is a constant for calculating the steering angle (deg) from the torque added to the steering wheel 10. The calculated alert steering angle θa is output to the driver steering angle calculation unit 114.

$$\theta a = ATR/\text{torque constant} \quad (2)$$

The driver steering angle calculation unit 114 is a functional block for calculating the driver steering angle θd that is a steering angle corresponding to the steering amount of the driver. The steering angle θ of the steering wheel 10 detected by the steering angle sensor 51 and the alert steering angle θa calculated by the alert steering angle calculation unit 112 are input to the driver steering angle calculation unit 114. The driver steering angle calculation unit 114 calculates the driver steering angle θd excluding the alert steering angle θa due to the alert reaction force from the steering angle θ according to the following equation (3).

$$\theta d = \theta - \theta a \quad (3)$$

The target turning angle calculation unit 116 receives an input of the driver steering angle θd, and outputs the target turning angle θwt in response to an input of the driver steering angle θd. The target turning angle calculation unit 116 calculates the target turning angle θwt using the above-described equation (1). The calculated target turning angle θwt is output to the turning angle control unit 120.

The turning angle control unit 120 controls the turning motor 41 so that the steering angle of the wheels WH becomes the target turning angle θwt. According to such a turning angle calculation process, since the influence of the alert reaction force is eliminated from the steering angle of the wheels WH, the deterioration of the behavior of the vehicle is prevented.

Figure 8:
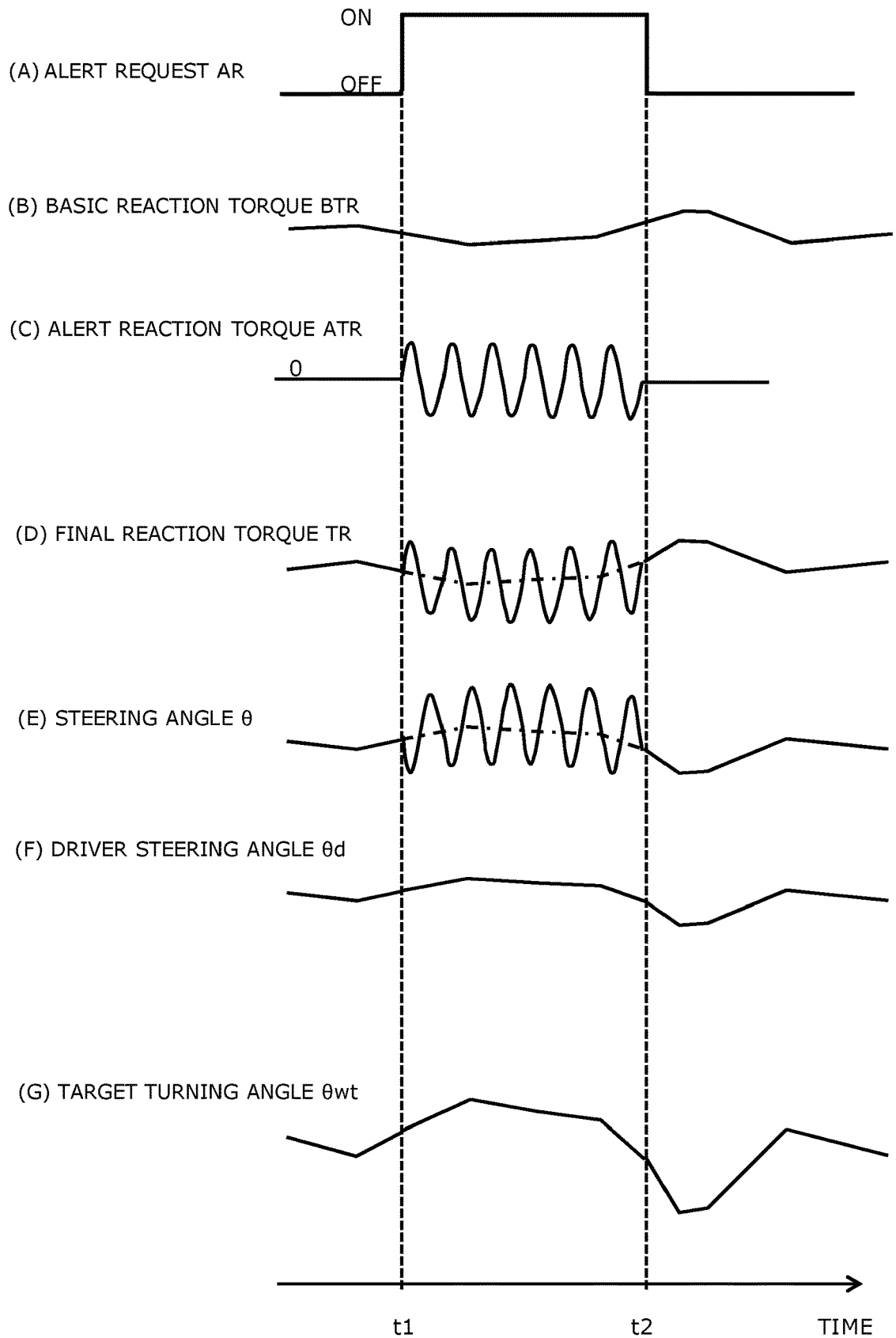
FIG. 8 is a time chart showing changes in various state amounts while the alert request is issued in the steering control system according to the first embodiment.

The above-described alert control and the turning angle calculation process are executed as follows. FIG. 8 is a time chart showing changes in various state amounts while the alert request is issued in the steering control system according to the first embodiment. In FIG. 8, the chart (A) shows the alert request AR, the chart (B) shows the basic reaction torque BTR, the chart (C) shows the alert reaction torque ATR, the chart (D) shows the final reaction torque TR, the chart (E) shows the steering angle θ, the chart (F) shows the driver steering angle θd, and the chart (G) shows the target turning angle θwt.

As shown in the chart (A) in FIG. 8, during the period from the time t1 to the time t2 at which the alert request AR is issued, the alert reaction torque ATR is superimposed on the final reaction torque TR as shown in the chart (D). Therefore, as shown in the chart (E), the alert reaction torque ATR is reflected in the steering angle θ. However, according to the steering control system 1 of the present embodiment, the influence of the alert reaction torque ATR is not superimposed on the driver steering angle θd shown in the chart (F). Thus, it is possible to prevent the vibration caused by the alert control from being reflected in the target turning angle θwt shown in the chart (G).

1-5. Modified Example

The steering control system 1 according to the first embodiment may be modified as described below.

The target turning angle calculation unit 116 may calculate the target turning angle θwt in further consideration of the state of the vehicle such as the vehicle speed, the yaw rate, and the lateral acceleration. In this case, it is sufficient to determine the relationship between the driver steering angle θd and the target turning angle θwt for each state of the vehicle. The configuration of this modified example may also be applied to the steering control systems of other embodiments to be described later.

The alert steering angle calculation unit 112 may calculate the alert steering angle θa in consideration of inertia, friction, and the like of the reaction torque motor 31. In this case, the reaction force generating device 30 sends a reaction torque motor state information STR indicating the state of the reaction torque motor 31 to the controller 100. For example, the reaction torque motor state information STR includes, a drive voltage, a drive current, a rotation angle, a rotation speed, temperature, and the like, of the reaction torque motor 31. The alert steering angle calculation unit 112 may correct the alert steering angle θa using these reaction torque motor status information STR. The configuration of this modified example may also be applied to the steering control systems of other embodiments to be described later.

There is no limitation on the method in which the alert reaction torque calculation unit 134 calculates the alert reaction torque ATR. For example, the alert reaction torque ATR may adopt a specified amplitude and vibration period (i.e., a fixed value). The alert reaction torque calculation unit 134 may be configured to reflect the emergency degree ED only to the vibration amplitude of the alert reaction torque ATR, or may be configured to reflect the emergency degree ED only to the vibration period of the alert reaction torque ATR. The configuration of this modified example may also be applied to the steering control system of other embodiments to be described later.

A part of the functions of the turning angle calculation unit 110 may be installed in the reaction torque calculation unit 130. For example, the alert steering angle calculation unit 112 and the driver steering angle calculation unit 114 may be installed in the reaction torque calculation unit 130. In this case, the reaction torque calculation unit 130 may output the calculated driver steering angle θd to the turning angle calculation unit 110. The configuration of this modified example may also be applied to the steering control system of the second embodiment to be described later.

2. Second Embodiment

2-1. Features of Second Embodiment

The steering control system according to the second embodiment is characterized in that, in the turning angle calculation process, the effect of the alert reaction torque ATR on the steering angle is subtracted from the target turning angle $\theta wt$. The configuration of the steering control system according to the second embodiment is the same as that of the steering control system 1 according to the first embodiment, except for the configuration of a turning angle calculation unit 210. In addition, the basic concepts of the turning angle control and the reaction torque control are the same as those of the first embodiment. Descriptions overlapping with the first embodiment are omitted as appropriate.

Figure 9:
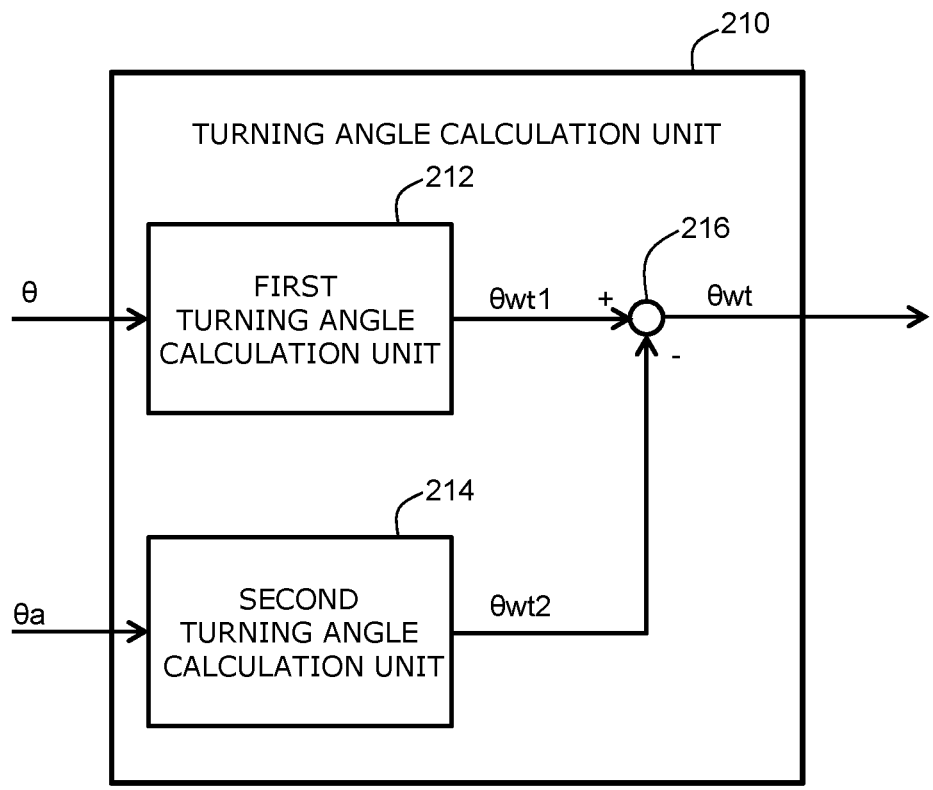
FIG. 9 is a diagram for explaining functions of a turning angle calculation unit according to a second embodiment.

FIG. 9 is a diagram for explaining functions of the steering angle calculation unit according to the second embodiment. The turning angle calculation unit 210 of the steering control system according to the second embodiment includes a first turning angle calculation unit 212, a second turning angle calculation unit 214, and a target turning angle calculation unit 216.

The first turning angle calculation unit 212 receives an input of the steering angle $\theta$, and outputs a first target turning angle $\theta wt1$. The steering angle $\theta$ is a steering angle of the steering wheel 10 detected by the steering angle sensor 51. The steering angle $\theta$ is a steering angle including vibration by the alert reaction torque ATR. The first turning angle calculation unit 212 calculates the first target turning angle $\theta wt1$ using the following equation (4) using the steering angle $\theta$ and the speed increasing rate K. The calculated first target turning angle $\theta wt1$ is output to the target turning angle calculation unit 216.

$$\theta wt1 = \theta \times K \quad (4)$$

The second turning angle calculation unit 214 receives an input of the alert steering angle $\theta a$, and outputs the second target turning angle $\theta wt2$. The alert steering angle $\theta a$ is a steering angle corresponding to the vibration of the steering wheel 10 by the alert reaction torque ATR. The second turning angle calculation unit 214 calculates the second target turning angle $\theta wt2$ using the following equation (5) using the alert steering angle $\theta a$ and the speed increasing rate K. The calculated second target turning angle $\theta wt2$ is output to the target turning angle calculation unit 216.

$$\theta wt2 = \theta a \times K \quad (5)$$

The target turning angle calculation unit 216 is a functional block for calculating a target turning angle $\theta wt$ that is a steering angle corresponding to the steering amount of the driver. The first target turning angle $\theta wt1$ calculated by the first turning angle calculation unit 212 and the second target turning angle $\theta wt2$ calculated by the second turning angle calculation unit 214 are input to the target turning angle calculation unit 216. The target turning angle calculation unit 216 calculates a target turning angle $\theta wt$ excluding the second target turning angle $\theta wt2$ from the first target turning angle $\theta wt1$ according to the following equation (6).

$$\theta wt = \theta wt1 - \theta wt2 \quad (6)$$

The target turning angle $\theta wt$ calculated by the target turning angle calculation unit 216 is output to the turning angle control unit 120. The turning angle control unit 120 controls the turning motor 41 so that the steering angle of the wheels WH becomes the target turning angle $\theta wt$. According to such a turning angle calculation process, since the influence of the alert reaction force is eliminated from the steering angle of the wheels WH, the deterioration of the behavior of the vehicle is prevented.

3. Third Embodiment

3-1. Features of Third Embodiment

A steering control system according to the third embodiment is characterized in that, in the turning angle calculation process, the vibration component of the steering angle $\theta$ caused by the alert reaction torque ATR is removed by the filtering process. The configuration of the steering control system according to the third embodiment is the same as that of the steering control system 1 according to the first embodiment, except for the configuration of a turning angle calculation unit 310. In addition, the basic concepts of the turning angle control and the reaction torque control are the same as those of the first embodiment. Descriptions overlapping with the first embodiment are omitted as appropriate.

Figure 10:
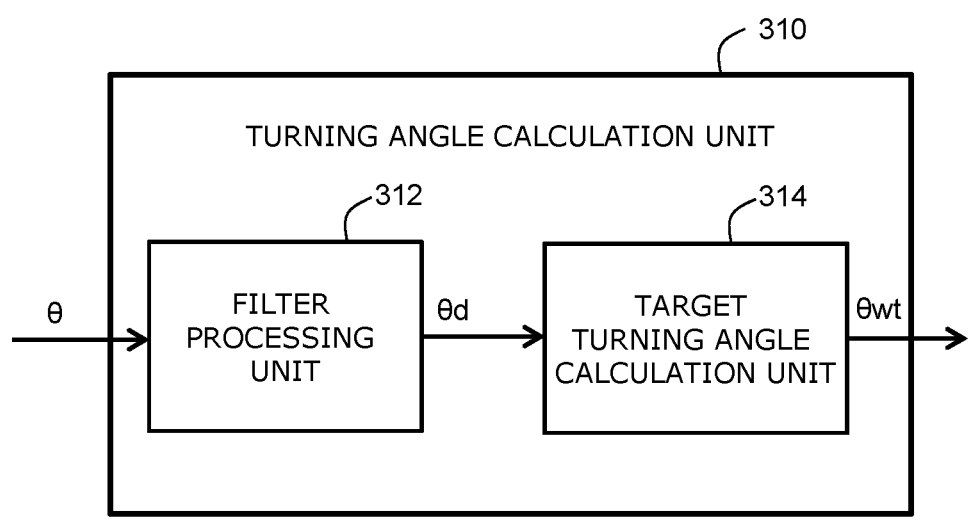
FIG. 10 is a diagram for explaining functions of a turning angle calculation unit according to a third embodiment.

FIG. 10 is a diagram for explaining the function of the steering angle calculation unit according to the third embodiment. The turning angle calculation unit 310 of the steering control system according to the third embodiment includes a filter processing unit 312 and a target turning angle calculation unit 314.

The filter processing unit 312 removes the vibration component of the steering angle $\theta$ by the alert reaction torque ATR by performing the filter processing on the steering angle $\theta$. The filter used for the filter processing is, for example, a band-pass filter BPF. The band-pass filter BPF is a filter that extracts bands of a specific frequency range (Xlow (Hz)<BPF<Xhigh (Hz)). The specific frequency range corresponds to the band that does not include the vibration component (i.e., high frequency component) of the steering angle $\theta$ by the alert reaction torque ATR. The filter processing unit 312 calculates the driver steering angle $\theta d$ in which the vibration component due to the alert reaction torque ATR is removed from the steering angle $\theta$ using the following equation (7) using the band-pass filter BPF. The calculated driver steering angle $\theta d$ is output to the target turning angle calculation unit 314.

$$\theta d = BPF(\theta, X\text{low (Hz)}, X\text{high (Hz)}) \quad (7)$$

Alternatively, the filter processing unit 312 may use a low-pass filter LPF. The low-pass filter LPF is a filter that extracts bands of a specific low-frequency range (Xlow (Hz)<LPF). The specific low frequency range corresponds to the band that does not include the vibration component (i.e., high frequency component) of the steering angle $\theta$ by the alert reaction torque ATR. The filter processing unit 312 calculates the driver steering angle $\theta d$ in which the vibration component due to the alert reaction torque ATR is removed from the steering angle $\theta$ using the following equation (8) using the low-pass filter LPF. The calculated driver steering angle $\theta d$ is output to the target turning angle calculation unit 314.

$$\theta d = LPF(\theta, X\text{low (Hz)}) \quad (8)$$

The target turning angle calculation unit 314 receives an input of the driver steering angle $\theta d$, and outputs the target turning angle $\theta wt$. The target turning angle calculation unit 314 calculates the target turning angle θwt using the following equation (9) using the driver steering angle θd and the speed increasing rate K.

$$θwt = θd × K \quad (9)$$

The target turning angle θwt calculated by the target turning angle calculation unit 314 is output to the steering angle control unit 120. The turning angle control unit 120 controls the turning motor 41 so that the steering angle of the wheels WH becomes the target turning angle θwt. According to the turning angle calculation process, it is possible to prevent the vibration caused by the alert reaction torque ATR from being superimposed on the steering angle of the wheels WH.

3-2. Modified Example

The steering control system according to the third embodiment may be modified as described below.

The filter processing unit 312 is not limited to the type and the band range as long as it is a filter that removes the vibration component (i.e., high frequency component) of the steering angle θ caused by the alert reaction torque ATR.

4. Fourth Embodiment

4-1. Features of Fourth Embodiment

A steering control system according to the fourth embodiment is characterized in that, in the turning angle calculation process, the vibration component of the steering angle θ caused by the alert reaction torque ATR is removed by the filtering process. The configuration of the steering control system according to the fourth embodiment is the same as that of the steering control system 1 according to the first embodiment, except for the configuration of a steering angle calculation unit 410. In addition, the basic concepts of the turning angle control and the reaction torque control are the same as those of the first embodiment. Descriptions overlapping with the first embodiment are omitted as appropriate.

Figure 11:
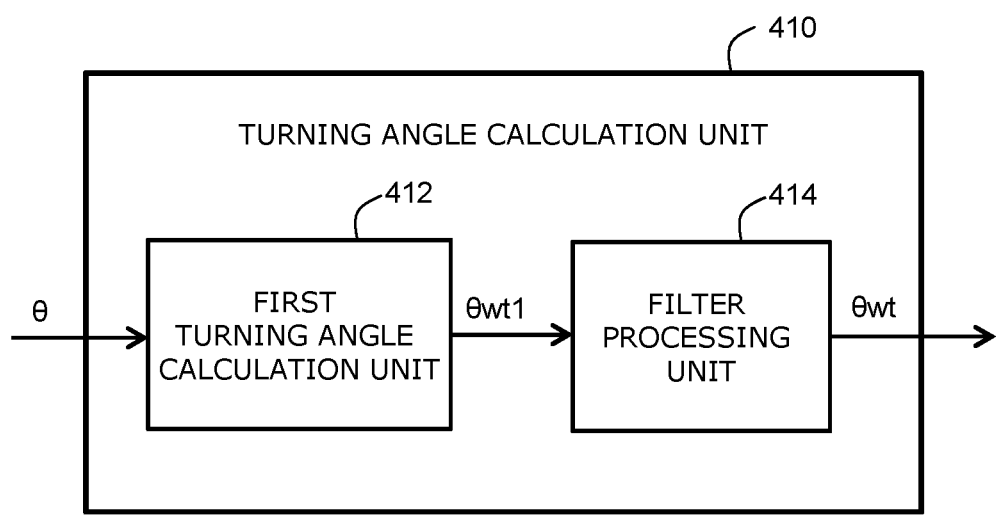
FIG. 11 is a diagram for explaining functions of the turning angle calculation unit according to a fourth embodiment.

FIG. 11 is a diagram for explaining functions of the steering angle calculation unit according to the fourth embodiment. The steering angle calculation unit 410 of the steering control system according to the fourth embodiment includes a first turning angle calculation unit 412 and a filter processing unit 414.

The first turning angle calculation unit 412 receives an input of the steering angle θ, and outputs the first target turning angle θwt1. The first turning angle calculation unit 412 is a block having the same function as the first turning angle calculation unit 212 of the steering control system according to the second embodiment. The first turning angle calculation unit 412 calculates the first target turning angle θwt1 using the above equation (4) using the steering angle θ and the speed increasing rate K. The calculated first target turning angle θwt1 is output to the filter processing unit 414.

The filter processing unit 414 removes the vibration component of the steering angle by the alert reaction torque ATR by performing the filter processing to the first target turning angle θwt1. The filter used for the filter processing is, for example, a band-pass filter BPF. The Band-pass filter BPF is a filter that extracts bands of a specific frequency range (Ylow (Hz)<BPF<Yhigh (Hz)). The specific frequency range corresponds to the band that does not include the vibration component (i.e., high frequency component) of the target turning angle by the alert reaction torque ATR. The filter processing unit 414 calculates the target turning angle θwt in which the frequency component of the vibration caused by the alert reaction torque ATR is removed from the first target turning angle θwt1 using the following equation (10) using the band-pass filter BPF. The calculated target turning angle θwt is output to the turning angle control unit 120.

$$θwt = BPF(θwt1, Ylow\ (Hz), Yhigh\ (Hz)) \quad (10)$$

Alternatively, the filter processing unit 414 may use a low-pass filter LPF. The low-pass filter LPF is a filter that extracts bands of a specific low-frequency range (Ylow (Hz)<LPF). The specific low frequency range corresponds to the band that does not include the vibration component (i.e., high frequency component) of the target turning angle by the alert reaction torque ATR. The filter processing unit 414 calculates the target turning angle θwt in which the vibration component due to the alert reaction torque ATR is removed from the first target turning angle θwt1 using the following equation (11) using the low-pass filter LPF. The calculated target turning angle θwt is output to the turning angle control unit 120.

$$θwt = LPF(θwt1, Ylow\ (Hz)) \quad (11)$$

The turning angle control unit 120 controls the turning motor 41 so that the steering angle of the wheels WH becomes the target turning angle θwt. According to the turning angle calculation process, it is possible to prevent the vibration caused by the alert reaction torque ATR from being superimposed on the steering angle of the wheels WH.

4-2. Modified Example

The steering control system of the fourth embodiment may be modified as described below.

The filter processing unit 414 is not limited to the type and the band range as long as it is a filter for removing the vibration component (i.e., high frequency component) of the target turning steering angle by the alert reaction torque ATR.

What is claimed is:

1. A steering control system for a steer-by-wire vehicle, the steering control system comprising:
   a turning motor for turning wheels of the vehicle;
   a reaction torque motor for applying a reaction torque to a steering wheel of the vehicle;
   a controller configured to execute:
     a turning angle calculation for calculating a target turning angle of the wheels for controlling the turning motor based on a steering angle of the steering wheel; and
     a reaction torque calculation for calculating a target reaction torque for controlling the reaction torque motor based on a state of the vehicle,
   wherein, when an alert request is issued, in the reaction torque calculation, the controller is configured to:
     calculate a basic reaction torque based on the steering angle,
     calculate an alert reaction torque for notifying the state of the vehicle, and
     calculate the target reaction torque, which is a total torque obtained by summing the basic reaction torque and the alert reaction torque,
   wherein, in a process of the turning angle calculation calculating the target turning angle from the steering angle, the controller is configured to calculate the target turning angle by excluding a steering angle or a turning angle corresponding to the alert reaction torque, and wherein, in the turning angle calculation, the controller is configured to:
calculate a driver steering angle from which a frequency component of a steering angle corresponding to the alert reaction torque is removed by performing a filter processing on the steering angle, and
calculate the target turning angle based on the driver steering angle.

2. The steering control system according to claim 1,
wherein, in the reaction torque calculation, the controller is configured to change a vibration amplitude or a vibration period of the alert reaction torque according to an emergency degree of the state of the vehicle.

3. The steering control system according to claim 1,
wherein, the alert request is a request issued based on a determination that the vehicle in travel deviates from a traveling lane.

4. A steering control system for a steer-by-wire vehicle, the steering control system comprising:
a turning motor for turning wheels of the vehicle;
a reaction torque motor for applying a reaction torque to a steering wheel of the vehicle;
a controller configured to execute:
a turning angle calculation for calculating a target turning angle of the wheels for controlling the turning motor based on a steering angle of the steering wheel; and
a reaction torque calculation for calculating a target reaction torque for controlling the reaction torque motor based on a state of the vehicle,
wherein, when an alert request is issued, in the reaction torque calculation, the controller is configured to:
calculate a basic reaction torque based on the steering angle,
calculate an alert reaction torque for notifying the state of the vehicle, and
calculate the target reaction torque, which is a total torque obtained by summing the basic reaction torque and the alert reaction torque,
wherein, in a process of the turning angle calculation calculating the target turning angle from the steering angle, the controller is configured to calculate the target turning angle by excluding a steering angle or a turning angle corresponding to the alert reaction torque, and
wherein, in the turning angle calculation, the controller is configured to:
calculate a first turning angle based on the steering angle, and
calculate the target turning angle from which the frequency component of the steering angle corresponding to the alert reaction torque is removed by performing a filter processing on the first turning angle.

5. The steering control system according to claim 4,
wherein, in the reaction torque calculation, the controller is configured to change a vibration amplitude or a vibration period of the alert reaction torque according to an emergency degree of the state of the vehicle.

6. The steering control system according to claim 4,
wherein, the alert request is a request issued based on a determination that the vehicle in travel deviates from a traveling lane.

* * * * *